(12) United States Patent
Lv

(10) Patent No.: US 11,748,123 B2
(45) Date of Patent: Sep. 5, 2023

(54) TRANSFORMING A REMOTE DESKTOP INTO A REMOTE APPLICATION

(71) Applicant: VMware, Inc., Palo Alto, CA (US)

(72) Inventor: Lin Lv, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/684,439

(22) Filed: Mar. 2, 2022

(65) Prior Publication Data
US 2023/0221967 A1 Jul. 13, 2023

(30) Foreign Application Priority Data
Jan. 10, 2022 (WO) ................ PCT/CN2022/071081

(51) Int. Cl.
*G06F 9/44* (2018.01)
*G06F 9/451* (2018.01)
(52) U.S. Cl.
CPC .................................. *G06F 9/452* (2018.02)

(58) Field of Classification Search
CPC ...................................................... G06F 9/542
USPC ........................................................ 719/319
See application file for complete search history.

(56) References Cited

PUBLICATIONS

"Use Unity Mode", available at https://docs.vmware.com/en/VMware-Workstation-Pro/16.0/com.vmware.ws.using.doc/GUID-8C477788-7700-4030-8C4A-039C02AABB74.html, May 31, 2019.

*Primary Examiner* — Timothy A Mudrick
(74) *Attorney, Agent, or Firm* — SU IP CONSULTING

(57) ABSTRACT

A method transforms a remote desktop into a remote application, specifically by cropping a window of a remote desktop so that only a window of an application running on the remote desktop is rendered on a local desktop of a user device. A first action performed by the user can trigger the remote desktop-to-application transformation (including the cropping), and a second action performed by the user can reverse the transformation (including stopping the cropping).

21 Claims, 6 Drawing Sheets

TRANSFORMING A REMOTE DESKTOP INTO A REMOTE APPLICATION

CROSS-REFERENCE TO RELATED APPLICATION

The present application claims the benefit of Patent Cooperation Treaty (PCT) Application No. PCT/CN2022/071081, filed Jan. 10, 2022, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a remote desktop to run on VMs that are provided by a hypervisor on a host. A user/client uses the operating system (OS) and applications (which reside and execute at the VM) via an endpoint device (client device) of the user, just as if the OS/applications were actually running locally on the endpoint device, when in reality the OS/applications are running on the remote desktop.

However, there are drawbacks associated with concurrently/collaboratively using local applications (installed at the client device) and applications running on the remote desktop).

DETAILED DESCRIPTION

Figure 1:
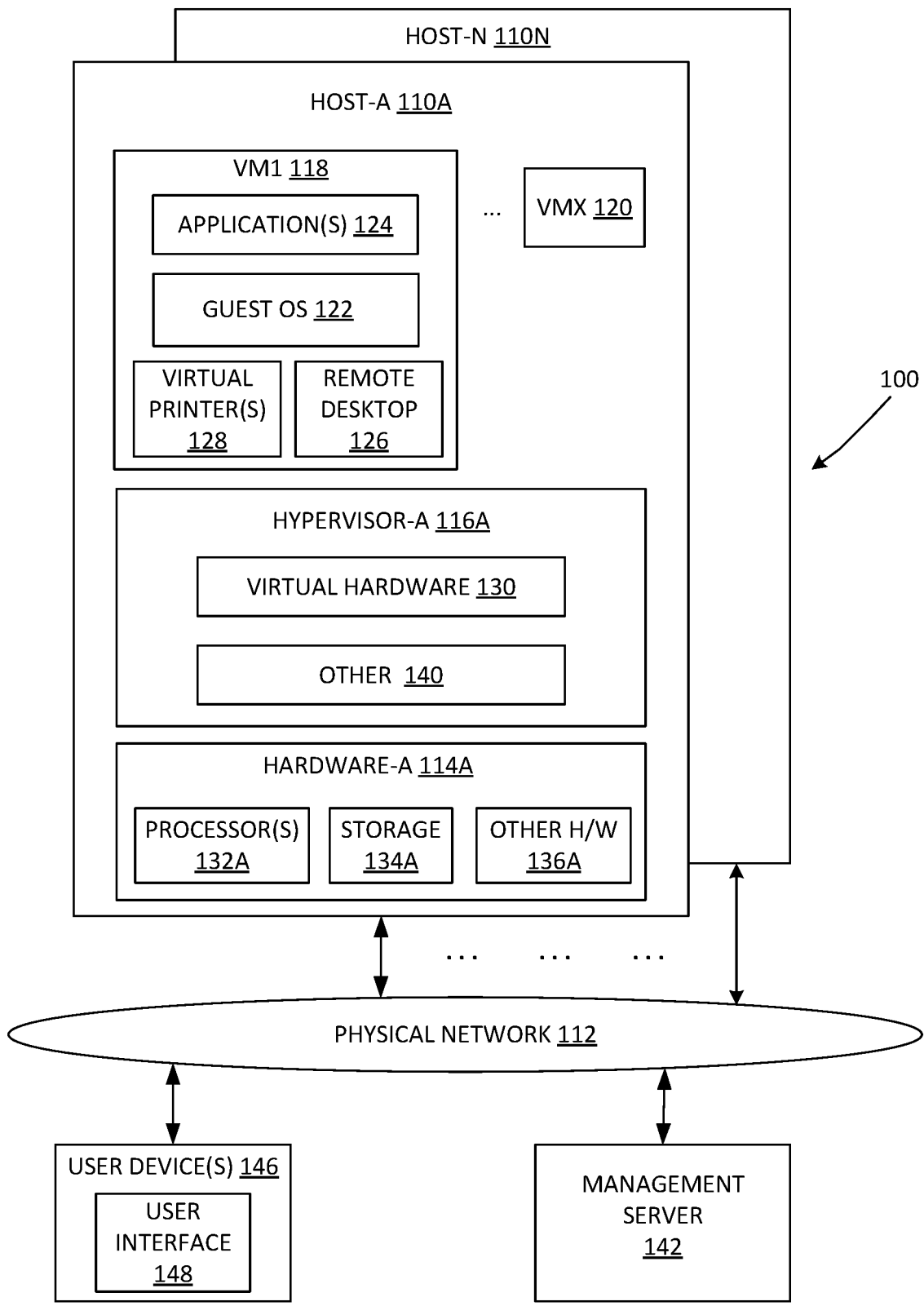
FIG. 1 is a schematic diagram illustrating an example virtualized computing environment that can implement a virtual desktop infrastructure (VDI) with remote desktop transformation capability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks associated with concurrently/collaboratively using local applications (installed at a client device) and applications installed/running at a remote desktop. For example, when a user is working on a remote desktop, the user in many cases is not only using the applications installed on the remote desktop but also using the applications installed on the local device (client device), so that the user's work can be performed more efficiently. For instance, a user may play a video using a media application installed on the client device, while editing a document using a word processing application installed on the remote desktop.

An advantage of simultaneously/collaboratively working on the remote desktop and the client device is that users can leverage the hardware and software at both the local and remote locations to improve their working efficiency, for example by dispatching certain tasks to the proper device (e.g., either to the client device or to the remote desktop). Also, using the client device for some of the work reduces the hardware consumption of the remote desktop, which is advantageous when an increased number of remote desktops are deployed on a public cloud. Furthermore, reducing hardware and network bandwidth consumption at remote desktops provides cost savings.

However, there are disadvantages with when concurrently using a remote desktop and a client device. First, users often have to frequently switch their working environment between the remote desktop and the client device, especially when working on a laptop computer or desktop computer with only one display screen. In this situation, users are not able to see the local application and the application running on the remote desktop at the same time, and so the users have to switch between desktops. This limitation is inconvenient when users want to work with a local application and an application (running on the remote desktop) collaboratively.

As another example, a user may need to input data displayed on a local application into an application running on the remote desktop, but this process is cumbersome with current implementations that require switching between local and remote desktops. An advantage of remote applications is that they look like local applications, and so the user can use the remote applications with local applications in a collaborative manner.

The various embodiments disclosed herein address at least some of the foregoing drawbacks, while also providing the advantages associated with the concurrent/collaborative use of local applications with remote desktops. The embodiments provide techniques wherein the remote desktop is transformed so as to appear like an application, and the application is presented to and can be used by the user in a manner similar to a local application on the local desktop (when in reality the application is a remote application). With this transformation, switching between a local desktop and a remote desktop can be avoided—the user may be presented with a single desktop (rather than multiple desktops), which is advantageous in situations where the client device only has a single display screen.

Computing Environment

To further explain the details of the remote desktop transformation, reference is first made herein to FIG. 1, which is a schematic diagram illustrating an example virtualized computing environment 100 that can implement virtual desktop infrastructure (VDI) with remote desktop transformation capability. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (and their corresponding processes) that run on top of the guest OS 122. Using the guest OS 122 and/or other resources of VM1 118 and the host-A 110A, VM1 118 may generate a remote desktop 126 (virtual desktop) that is operated by and accessible to one or more client-side user device(s) 146 (e.g., a client device or a local device) via the physical network 112. One or more virtual printers 128 also may be instantiated in VM1 118 and/or elsewhere in the host-A 110A, and may correspond to one or more physical printers (not shown) at the user device 146. VM1 118 may include other elements, such as code and related data (including data structures), engines, etc., which will not be explained herein in further detail, for the sake of brevity. The user device 146 may include a user interface 148 and other components (explained in more detail in FIGS. 2 and 5) to support the use of the user device 146 in cooperation with the virtual desktop 126 and other elements of VM1 118.

According to various embodiments, VM1 118 may operate as an agent that provides the remote desktop 126 (and other remote desktop features) to the user device. For instance, the agent can cooperate with client software (referred to at times herein as a remote desktop application, client application, or client, installed at the user device 146) to establish and maintain a remote desktop connection between VM1 118 and the user device 146 for purposes of enabling the user to operate the user interface 148 in order to use the remote desktop 126. In some embodiments, the agent can be a sub-component of VM1 118. Examples of the agent and client software are the Horizon agent and the Horizon client, respectively, of VMware, Inc. of Palo Alto, Calif. One or more connection servers can broker or otherwise manage communications between the agent (e.g., a Horizon agent) and the client software (e.g., a Horizon client) over a VDI connection 208 (shown in FIG. 2) provided by the physical network 112. A management server 142 and/or other server(s)/device(s) can operate as the connection server.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including agent-side caches used for print jobs for the virtual printers 128), a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
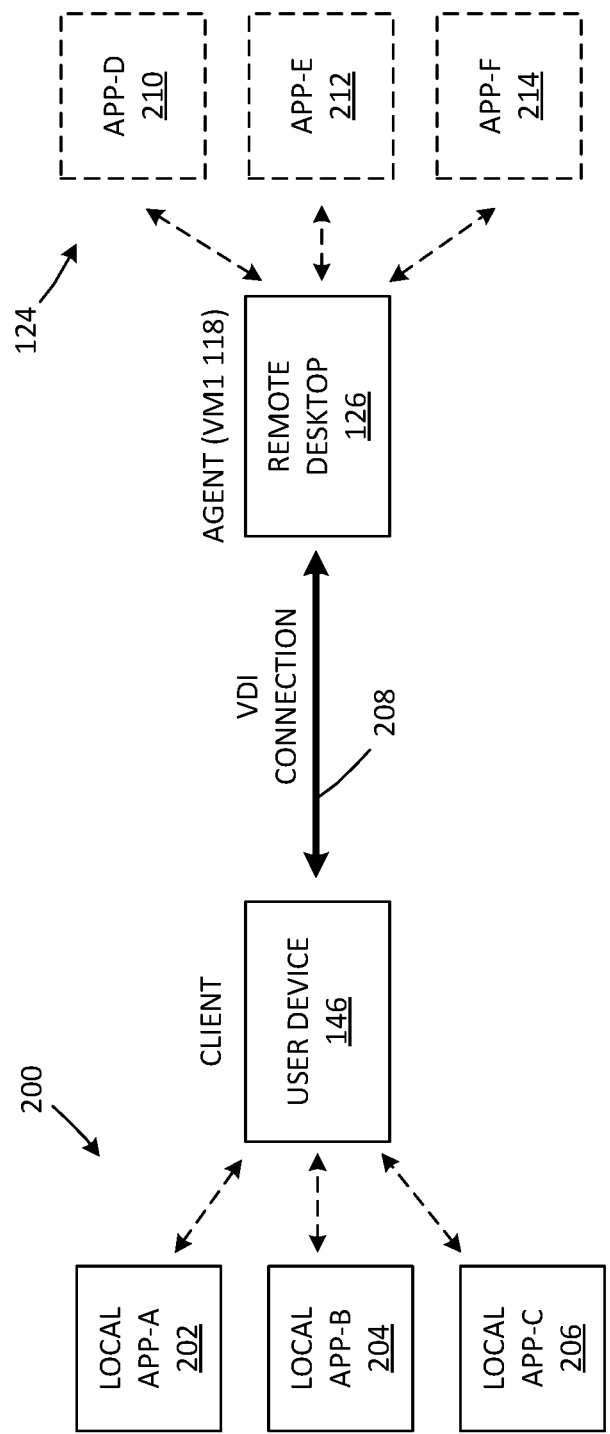
FIG. 2 is a schematic diagram illustrating client and agent devices for the virtualized computing environment of FIG. 1.

FIG. 2 is a schematic diagram illustrating client and agent devices for the virtualized computing environment 100 of FIG. 1. More specifically, FIG. 2 shows the client (e.g., running on the user device 146), the agent (e.g., the VM1 118 that provides the remote desktop 126 and which runs on a host), and their associated applications that may be displayed on their respective desktops.

At a client side 200, the user device 146 may have local applications (APPs) installed on it. These applications may include a local application-A 202, a local application-B 204, a local application-C 206, etc. These local applications (e.g., their respective icons or launched files/interfaces) may in turn be presented on a local desktop rendered on a display screen of the user device 146.

At an agent side, the remote desktop 126 may provide applications installed/running thereon (e.g., the applications 124 of FIG. 1). These applications on the remote desktop 126 may include an application-D 210, an application-E 212, an application-F 214, etc. These applications (e.g., their respective icons or launched files/interfaces) may in turn be presented on a window of the remote desktop 126 rendered on the display screen of the user device 146, when the user device 146 accesses the remote desktop 126.

Figure 3:
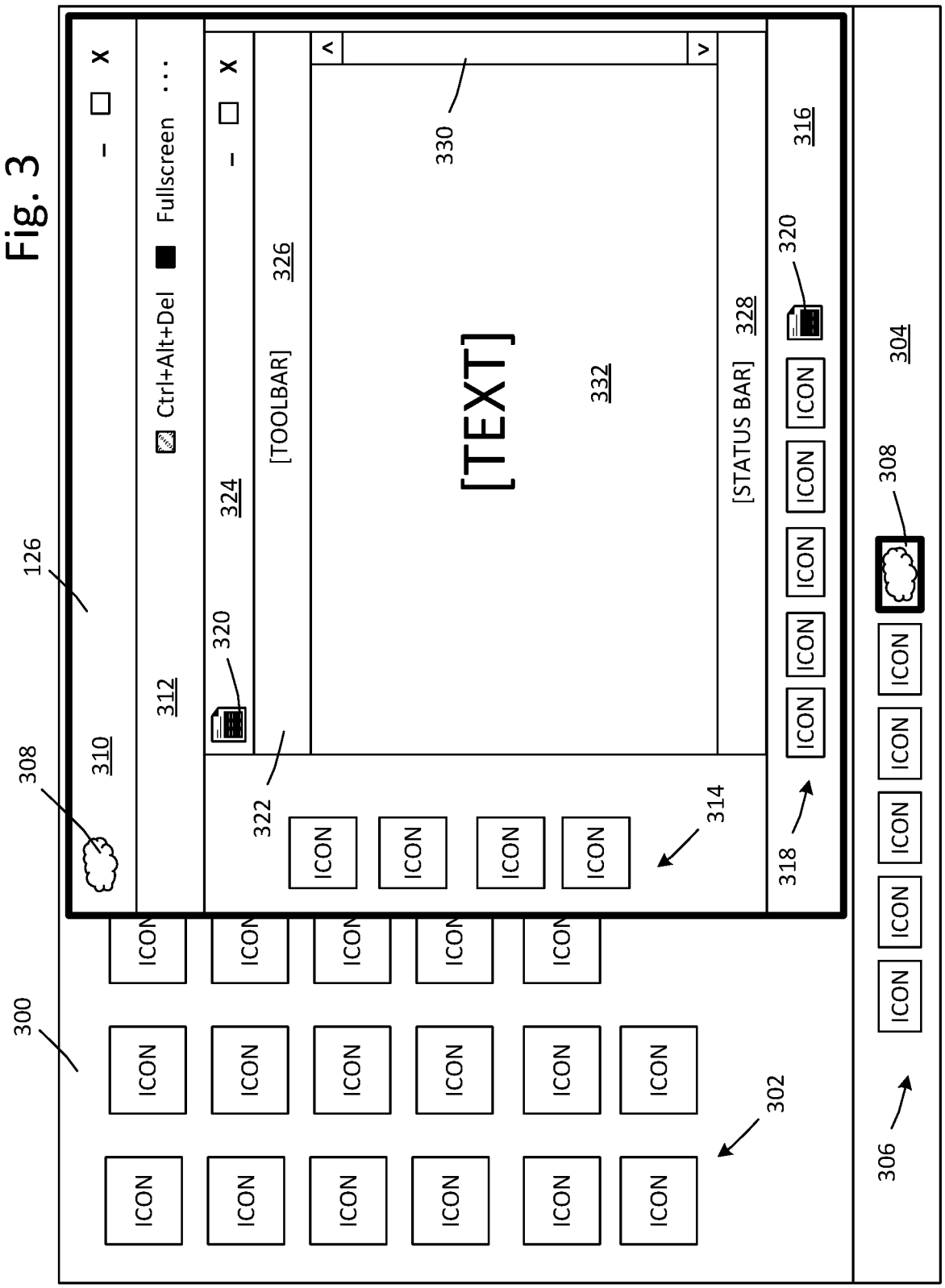
FIG. 3 is a diagram illustrating overlapping desktops.

FIG. 3 is a diagram illustrating overlapping desktops, and more specifically, an example of a window of the remote desktop 126 that overlaps a local desktop 300 after the VDI connection 208 is established between the client and the agent. The local desktop 300 displays a plurality of icons 302 representing a corresponding plurality of local applications installed on the user device 146. The local desktop 300 further displays a task bar 304 that pins/presents a plurality of icons 306 representing locally installed and/or currently active applications, files, etc.

One of the displayed icons 306 includes an icon 308 representing the remote desktop application (e.g., the Horizon client) that is currently being executed at the user device 146 in order to render the remote desktop 126. For example, the remote desktop application is configured to operate the user interface 148 (see FIG. 1) so that the window of the remote desktop 126 is rendered on the display screen of the user device 146 as a client window (e.g., a Horizon client window) that overlies the local desktop 300, such as shown in FIG. 3.

With respect to the remote desktop 126 itself, the example of FIG. 3 shows that the window of the remote desktop 126 includes a title bar 310 (having the icon 308 also displayed therein) at an upper region of the window of the remote desktop 126, another bar 312 under the title bar 310, a plurality of icons 314 representing a corresponding plurality of applications installed at the agent side (e.g., the applications 124 in the VM1 118), and a task bar 316 at a lower region of window of the remote desktop 126.

The task bar 316 pins/presents a plurality of icons 318 representing applications that are installed on and/or are currently active applications within the remote desktop 126, files at the remote desktop 126, etc. For instance, an icon 320 in the task bar 316 represents an application 322 (e.g., one or more of the applications 124 and 210-214 in FIGS. 1 and 2, such as a word processing application) on the remote desktop 126. The application 322 also displays its corresponding icon 320 in its title bar 324 at an upper region of the window of the application 322. In the example of FIG. 3, the application 322 is currently active/launched and is rendered by/in the window of the remote desktop 126 along with the other icons 314 and bars 310, 312, etc. of the remote desktop 126, and so may be referred to as an application on remote desktop. The window of the application 322 may in turn also show/include a tool bar 326 under the title bar 324, a status bar 328 at a lower region, a scroll bar 330 at a side region, and a workspace 332 in a middle region to display content of the application 322 such as text, graphics, etc.

Remote Desktop Transformation

As previously explained above, the overlapping desktops shown in FIG. 3 can be cumbersome to use by users, since the users will need to toggle/switch between desktops when using applications on a remote desktop and local applications concurrently/collaboratively. As shown in FIG. 3, the remote desktop 126 overlaps at least a portion of the local desktop 300, such that the user may have difficulty viewing icons and other content on both desktops at the same time.

Figure 4:
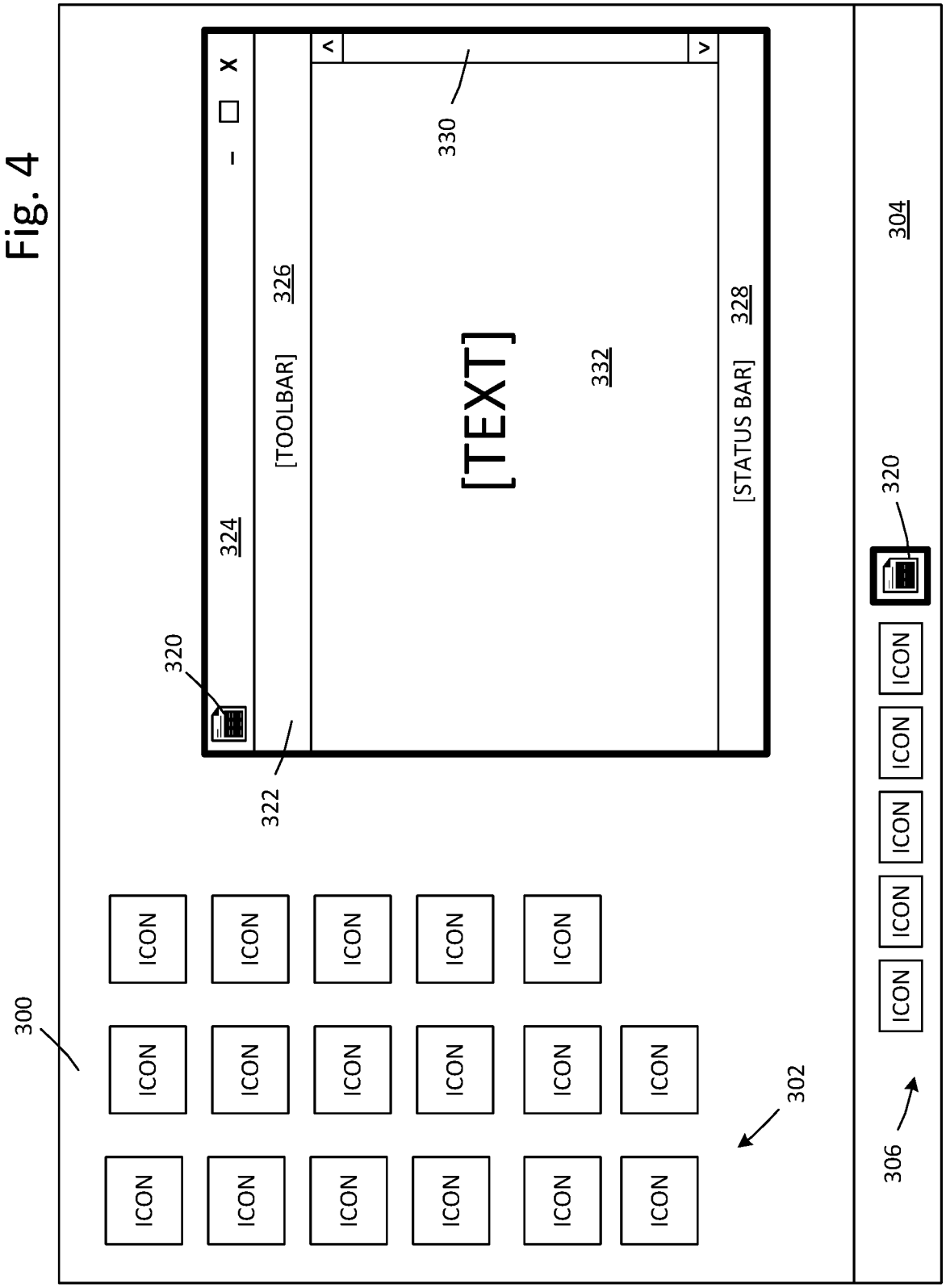
FIG. 4 is a diagram illustrating transformation of a remote desktop to a remote application.

FIG. 4 is a diagram illustrating transformation of a remote desktop to a remote application. More specifically, when the user device 146 connects to the remote desktop 126 and opens an application (e.g., the application 322), a remote desktop-to-application transformation may be triggered, such as by a predefined mouse or keyboard event (e.g., shaking a mouse or other mouse movement, or a combination/sequence of keyboard key presses) performed by the user at the user device 146. After this transformation is completed, window of the remote desktop 128 only displays the window of the active application 322 on the local desktop 300 and no other elements of the remote desktop 126. The application 322 displayed on the remote desktop 126 (without other elements of the remote desktop 126 being displayed) is referred to herein as a remote application.

For example and as shown in FIG. 4 and in comparison to FIG. 3, a cropping/hiding has been performed such that the window of the remote desktop 126 now only shows the window of the active remote application 322, which is rendered on the local desktop 300. The title bar 310, the bar 312, the task bar 316, and the region having the icons 314 have been removed (e.g., hidden or cropped out) of the window of the remote desktop 126 in FIG. 4. The window of the remote application 322 may be rendered concurrently on the local desktop 300 along with windows of active local application(s), thereby providing the user with capability to run both remote and local applications concurrently and to move data (e.g., copy, paste, etc.) or otherwise collaborate between the rendered application windows, without requiring the user to take additional steps to switch between local and remote desktops. Thus, the window of the remote application 322 is presented to the user in FIG. 4 as if the remote application is a local application.

Furthermore in the task bar 304 of the local desktop 300, the icon 308 of the remote desktop application icon (e.g., the Horizon client), as shown in FIG. 3, is now replaced with the icon 320 of the remote application 322, as shown in FIG. 4. Thus, with the icon 320 presented in the task bar 304 along with the icons of the locally installed applications, in addition to the window of the remote application 322 being rendered on the local desktop 300 (with other portions of the remote desktop 126 cropped out), the remote application 322 is further presented to the user in a visually similar manner as local applications on the same display screen. This provides the user with the illusion that all applications are locally installed, and users can use/operate the remote application 322 in a seamless manner as if it was a locally installed application (e.g., without the need to affirmatively take further actions to switch between desktops).

According to various embodiments, users may perform various actions to trigger a switch from the remote application window of FIG. 4 back to the remote desktop window of FIG. 3 (e.g., a reverse transformation). The actions to perform the reverse transformation can be the same actions performed previously to perform the remote desktop-to-application transformation (e.g., shaking the mouse or a sequence of key presses), or other different actions taken at the user device 146.

According to various embodiments, the application 322 shown in FIGS. 3 and 4 are both the same single instantiation of the application 322. The instantiation of the application 322 in FIG. 3 is being referred to herein as an application on remote desktop, since the application 322 (e.g., its application window) is rendered within the visible window of the remote desktop 126 along with other graphical elements of the remote desktop 126. The instantiation of the application 322 in FIG. 4 is being referred to herein as a remote application, since the graphical elements of the window of the remote desktop 126 have been hidden/cropped such that only application 322 (e.g., its application window) is being rendered on a cropped window of the remote desktop 126, thereby giving the user an illusion that the remote application 322 is a local application (since the window of the remote desktop 126 is not visible).

According to various embodiments, the top application window on a remote desktop is transformed as described herein into the remote application. In this manner, additional processing/coordination is not needed in order to determine which of multiple overlapping applications on remote desktop to display on top.

Figure 5:
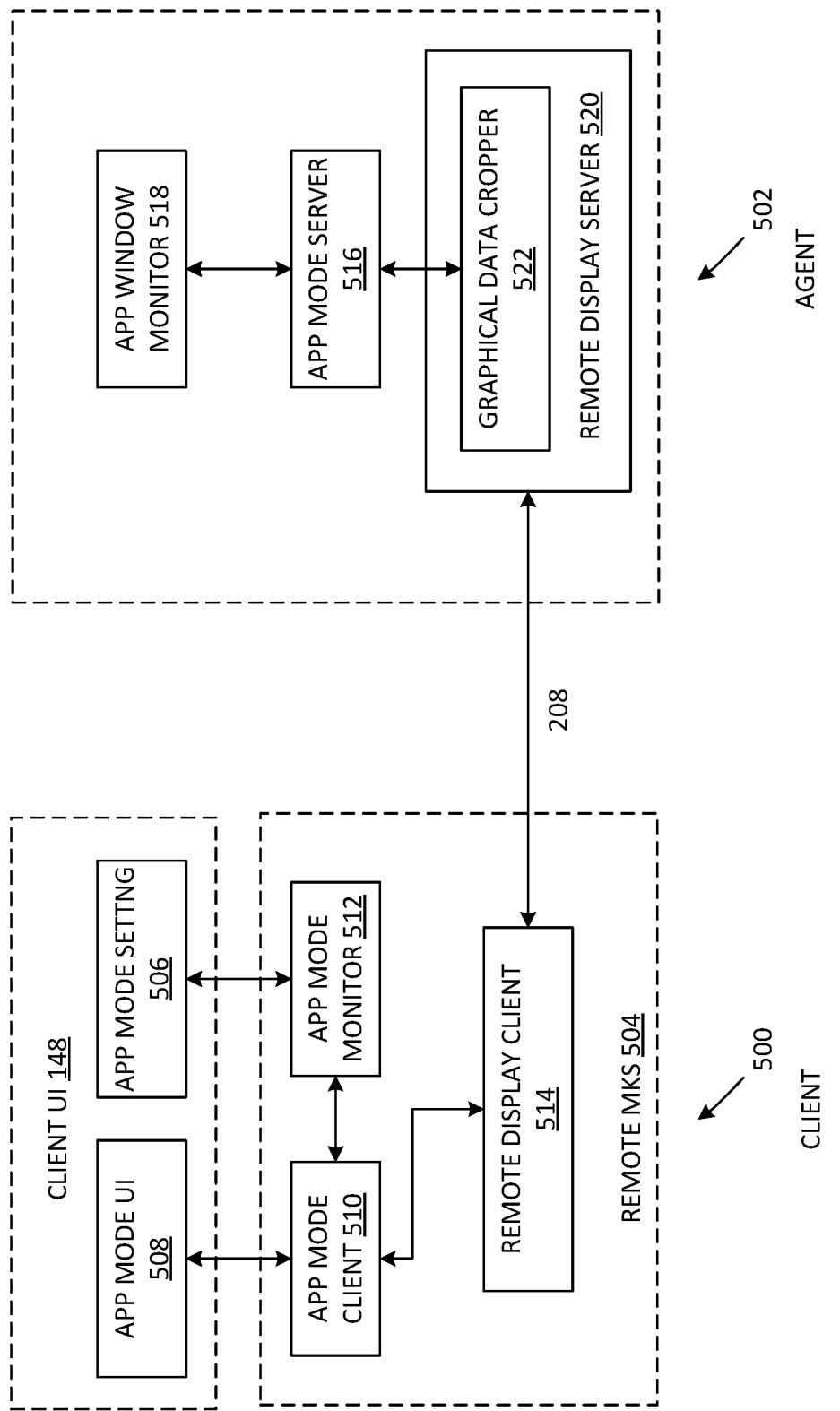
FIG. 5 is a schematic diagram illustrating components of a client and agent that cooperate to provide remote desktop transformation.

FIG. 5 is a schematic diagram illustrating components of a client 500 and an agent 502 that cooperate to provide remote desktop transformation, such as depicted in FIGS. 3 and 4 above. The client 500 may be comprised of a remote desktop application or other software (e.g., a Horizon client) that is locally installed at the user device 146 and that cooperates with the agent 502 (e.g., a Horizon agent, VM, or other software installed at a remote host) to provide the user device 146 with access to the remote desktop 126 (via the VDI connection 208 brokered/established by one or more connection servers). For instance, the connection server is configured to check a connection request (sent by the client 500) to connect to the agent 502, and to return the remote desktop 126 to the client 500 if the connection request is validated.

The client 500 of various embodiments is comprised of a client UI 148 (also shown in FIG. 1) and a remote mouse, keyboard, screen (MKS) unit 504. The client UI 148 and the MKS unit 504 are in turn comprised of various components, agents, services, daemons, engines, modules, units, or other code or computer-readable instructions that are executable by one or more processors, all of which are generically referred to herein as components.

The client UI 148 implements an application mode setting component 506 and an application mode UI component 508. The application mode setting component 506 provides the user with the option to switch the remote desktop 126 between a remote desktop mode (such as shown in FIG. 3) and a remote application mode (such as shown in FIG. 4). The application mode setting component 506 is configured to enable the user to specify a combination of key presses or other actions to initialize the remote desktop-to-application transformation (and/or for the reverse transformation), for instance "Ctrl+Alt+Shift+R". By default, the user can trigger this transformation by shaking the mouse, as an example, or via some other action performed at the user device 146.

The application mode UI component 508 is configured to hide the top menu bar(s), such as the bars 310 and 312 shown in FIG. 3, and other regions of the window of the remote desktop 126 during the remote desktop-to-application transformation. The application mode UI component 508 is further configured to return back the display/layout of these top menu bar(s) and other regions of the window of the remote desktop 126 during the reverse transformation (e.g., the application-to-remote desktop switching).

The remote MKS unit 504 includes an application mode client component 510, an application mode monitor component 512, and a remote display client component 514. The application mode monitor component 512 is communicatively coupled to the application mode setting component 506 and the application mode client component 510. The application mode monitor component 512 is configured to monitor the user's mouse and/or keyboard actions, so that the application mode monitor component 512 can inform the application mode client component 510 to initialize the remote desktop-to-application transformation (or the application-to-remote desktop reverse transformation) when users perform the predefined mouse and/or keyboard actions.

The application mode client component 510 is communicatively coupled to the application mode UI component 508, the application mode monitor component 512, and the remote display client component 514. The application mode client component 510 is configured to work with an application mode server component 516 at the agent 502 to perform the desktop-to-application transformation (or the application-to-remote desktop reverse transformation). For example, when the application mode monitor component 512 determines that the user has triggered the remote desktop-to-application transformation, the application mode monitor component 512 informs the application mode client component 510, and the application mode client component 510 in turn requests (via the remote display client component 514) the application mode server component 516 to provide one or more of the following data:

The graphical data for the current application's (e.g., the application 322 or some other application on remote desktop) window instead of the data for whole remote desktop 126; and The application's icon 320, window size, and position in the remote desktop 126.

After the application mode client component 510 receives the above data, the application mode client component 510 works with the remote display client component 514 and the application mode UI 148 to perform one or more of:

Resize the client window (e.g., a Horizon client window), displayed on the local desktop 300, to be the size of the remote application window;

Display graphical data of the current remote application, in the client window;

Replace the icon 308 (of the Horizon client or other remote desktop application) with the application icon 320, in the taskbar 304 of the local desktop 300; and Instruct the application mode UI component 508 to hide the top menu bar(s) (e.g., the bars 324 and 326) and/or other regions of the window of the remote desktop 126 that lie outside of the remote application window, in a manner such as shown in FIG. 4.

Actions opposite to those listed above may be performed, such as when the user wishes to perform the reverse transformation of the remote application back to the remote desktop. Furthermore, the application mode client component 510 is configured to work with the application mode server component 516 to keep the application mode client component 510 updated when certain actions are taken with respect to the remote application, such as: the window of the current remote application is resized, the window of the current remote application is moved on the desktop, the current remote application is changed to some other remote application, etc.

Now referring to the agent 502, the agent 502 is comprised of the application mode server component 516, an application window monitor component 518, and a remote display server component 520. The application window monitor component 518 is communicatively coupled to the application mode server component 516, and is configured to monitor for changes to the remote application, such as: the window of the current remote application is resized, the window of the current remote application is moved on the desktop, the current remote application is changed to some other remote application, etc. When one of these changes occurs, the application window monitor component 518 provides the application mode server component 516 with the updated/recent information for the remote application, so that the application mode server component 516 can (a) inform a graphical data cropper component 522 to properly crop the graphical data in the window of the remote desktop 126, and (b) inform the application mode client component 510 to properly crop/hide portions of the client window so that only the updated remote application window is shown.

The application mode server component 516 is communicatively coupled to the remote display server component 520 and to the application window monitor component 518, and is configured to perform one or more of the following:

Work with the application window monitor component 518 to get informed when the size or position of window of the remote application is changed;

Work with the application mode client component 510 at the client 500 to send the icon 320 of the remote application, the size of the window of the remote application, and the position of the remote application to the application mode client component 510, when the user triggers the remote desktop-to-application transformation. In this manner, the client 500 can display the graphical data of window of the remote application 322 correctly. During this remote application mode, the application mode server component 516 keeps communicating with the application mode client component 510 for any changes (e.g., size, position, etc.) to the window of the remote application 322. When the user wishes to switch back from the remote application mode back to the remote desktop mode, the application mode server component 516 is informed by the application mode client component 510, and then the application mode server component 516 instructs the graphical data cropper component 522 to stop cropping; and Work with the graphical data cropper component 522 to ensure that graphical data is cropped properly, such that only the window of the remote application is obtained when the remote desktop-to-application transformation is performed.

The graphical data cropper component 522 of various embodiments is implemented within the remote display server component 520, and as described above, is configured to crop the graphical data of the remote desktop 126 only in response to a request/instruction from the application mode server component 516 before the graphical data is sent to the client 500, and does not otherwise perform the cropping. Thus and in response to the user's instruction to perform the remote desktop-to-application transformation, the client 500 is able to display only the window of the current remote application.

Figure 6:
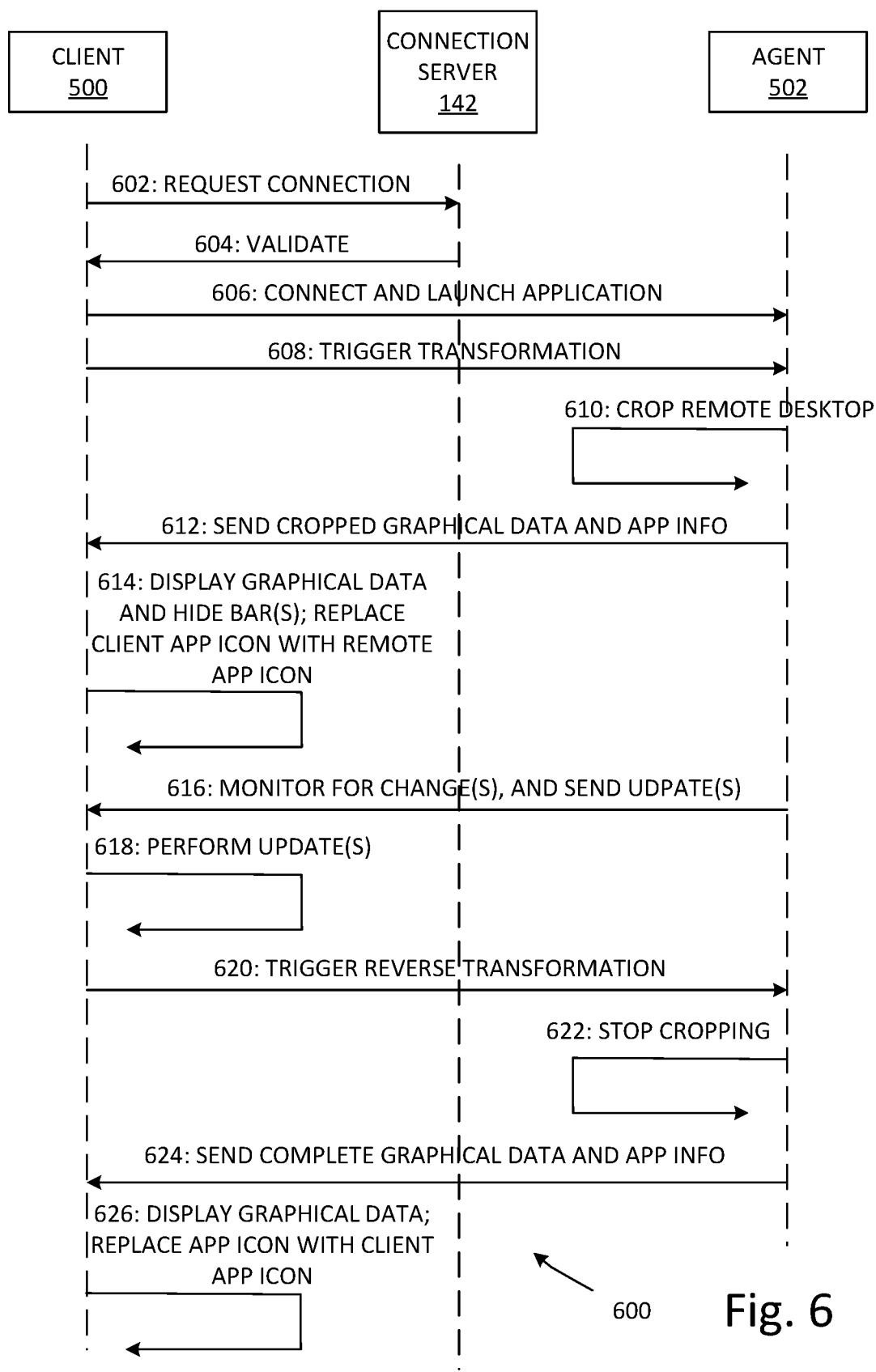
FIG. 6 is a flow diagram of an example method to perform a transformation between a remote desktop and a remote application.

FIG. 6 is a flow diagram of an example method 600 to perform a transformation between a remote desktop and a remote application. Example method 600 may include one or more operations, functions, or actions illustrated at 602 to 626. The various operations of the method 600 and/or of any other process(es) described herein may be combined into fewer operations, divided into additional operations, supplemented with further operations, and/or eliminated based upon the desired implementation. In one embodiment, the operations of the method 600 and/or of any other process(es) described herein may be performed in a pipelined sequential manner. In other embodiments, some operations may be performed out-of-order, in parallel, etc.

According to one embodiment, the method 600 may be performed by the client 500 and the agent 502, in cooperation with at least one connection server (e.g., the management server 142 or other device(s) in some embodiments) for some operations. In other embodiments, various other elements in a computing environment may perform, individually or cooperatively, the various operations of the method 600.

At 602 ("REQUEST CONNECTION"), the client 500 requests a connection to the agent 502, for purposes of accessing the remote desktop 126. This request at 602 may be performed by having the client 500 connect to the connection server and providing its credentials to the connection server. The connection server in turn brokers and establishes a communication between the client 500 and the agent 502, by validating the credentials of the client 500 and returning the remote desktop 126 to which the validated client is entitled, at 604 ("VALIDATE").

At 606 ("CONNECT AND LAUNCH APPLICATION"), the client 500 connects to the remote desktop 126 and launches an application on remote desktop (e.g., the application 322 shown in FIG. 3) installed on the remote desktop 126. At this point, the local desktop 300 at the client 500 may look like what is shown in FIG. 3, wherein a first window of the remote desktop 126 is overlapped over the local desktop 300 on the display screen of the user device 146, with a second window of the application 322 being rendered within the visible window of the remote desktop 126.

At 608 ("TRIGGER TRANSFORMATION"), the client 500 detects that the user has performed a predefined action (e.g., shaking the mouse, a sequence of key presses, etc.) to trigger the remote desktop-to-application transformation. In response to this predefined action, the client 500 sends a request to the agent 502 at the remote desktop 126 to perform the transformation.

At 610 ("CROP REMOTE DESKTOP"), the agent 502 crops the graphical data of the window of the remote desktop 126 based on the size and position of the window of the application 322, and only keeps the graphical data (and other content) of the window of the application 322.

At 612 ("SEND CROPPED GRAPHICAL DATA AND APP INFO"), the agent 502 sends the graphical data and information (e.g., window position, application icon, etc.) of the application 322 to the client 500. The graphical data sent to the client at 612 only includes the graphical data of the window of the application 322 and omits (due to the cropping/removal) the graphical data of the remote desktop 126 (e.g., the bars 310 and 312, the desktop region showing the icons 314, etc.) that lie outside of the window of the application 322. For instance, the agent 502 may send information to the client 500 as to which portions of the remote desktop 126 have been cropped out and does not send the cropped portions themselves to the client 500.

At 614 ("DISPLAY GRAPHICAL DATA AND HIDE BAR(S); REPLACE CLIENT APP ICON WITH REMOTE APP ICON"), wherein based on the information sent by the agent 502 at 612, the client 500 displays the graphical data and other content of the remote application 322, and hides the bars 310 and 312 (as well as the other regions of the remote desktop 126) of the window of the remote desktop 126 that is rendered on the local desktop 300. Further, the client 500 replaces the icon 308 of the remote desktop application with the icon 320 of the remote application 322, in the task bar 304 of the local desktop 300. The results when this remote desktop-to-application transformation is completed are thus shown in FIG. 4, wherein the cropped window of the remote desktop 126 only shows the window of the remote application 322 on the local desktop 300, such that the remote desktop 126 itself is not visible.

At 616 ("MONITOR FOR CHANGE(S), AND SEND UPDATE(S)"), the agent 502 monitors for any changes made by the user to the window of the remote application 322. For example and as previously explained above, the agent 502 updates the graphical data of the window of the remote application 322, if the user resizes the window size, moves the position of the window, switches to another application, etc. The agent 502 sends any updates to the client 500, and the client 500 may perform these and/or additional changes at 618 ("PERFORM UPDATE(S)"), which the agent 502 will monitor and respond to accordingly.

At 620 ("TRIGGER REVERSE TRANSFORMATION"), the user may request to switch back from the remote application mode to the remote desktop mode (e.g., perform an application-to-remote desktop transformation that is the reverse of the transformation previously described above). In this situation, the user may perform some predefined action (e.g., shaking the mouse, a sequence of key presses, etc.) that triggers the reverse transformation, and the agent 502 is notified. The agent 502 is notified of such user action to trigger the reverse transformation, and can thus stop the cropping of the graphical data of the remote desktop 126 at 622 ("STOP CROPPING") at the agent side and can instead send the complete graphical data of the remote desktop, as well as the information of the application 322, to the client 500 at 624 ("SEND COMPLETE GRAPHICAL DATA AND REMOTE APP INFO").

At 626 ("DISPLAY GRAPHICAL DATA; REPLACE APP ICON WITH CLIENT APP ICON"), the client 500 displays the full graphical data of the remote desktop 126, as well as the window of the application 322 (e.g., now an application on remote desktop) in the non-cropped window of the remote desktop. Furthermore, the icon 320 of the application 322 is replaced with the icon 308 of the remote desktop application that runs on the user device 146, in the task bar 304 of the local desktop. Thus, the view on the display screen of the user device 146 may revert back to what is shown in FIG. 3 previously described above.

From the embodiments disclosed herein, several benefits are realized. First, the boundary between a remote desktop and a remote application is blurred, by dynamically transforming the remote desktop into a remote application. The advantages of both a remote desktop and applications are thus obtained, thereby overcoming the limitations such as those previously described above wherein the user has to affirmatively switch between local and remote desktops on a single display screen.

Also, the working efficiency of users may be improved, especially for users who need to use a remote desktop and local applications collaboratively. The user experience with working remotely may also be improved. The embodiments described herein also can save on network bandwidth consumption, and therefore improve the user experience when poor network conditions exist.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-6. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to perform a transformation between a desktop and an application.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non-recordable media (e.g., read-only memory (ROM), random access memory (RAM), magnetic disk or optical storage media, flash memory devices, solid-state drive, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

I claim:

1. A method performed by a client to transform between a remote desktop and a remote application, the method comprising:
    rendering a first window of the remote desktop on a local desktop of a client device, wherein the first window of the remote desktop includes a second window of an application that runs on the remote desktop;
    detecting an action to trigger transformation from the remote desktop to the remote application, and sending a request to an agent to perform the transformation;
    receiving, from the agent in response to the request, information that pertains to the application that runs on the remote desktop, and based on at least on the received information that pertains to the application that runs on the remote desktop, hiding portions of the first window of the remote desktop that lie outside of the second window to obtain the remote application; and
    changing a task bar of the local desktop to replace an icon of the remote desktop with an icon of the remote application.

2. The method of claim 1, wherein the agent crops graphical data of the remote desktop that lie outside of the second window and sends the information pertaining to the cropped graphical data to the client, and wherein the information that pertains to the application that runs on the remote desktop includes a size of the second window and a position of the second window on the remote desktop.

3. The method of claim 2, wherein hiding the portions of the first window of the remote desktop that lie outside of the second window of includes hiding the graphical data that has been cropped by the agent, and wherein the cropped graphical data includes at least one of an upper bar, a lower bar, and icons displayed on the first window of the remote desktop.

4. The method of claim 1, further comprising:
    detecting an action to trigger a reverse transformation from the remote application back to the remote desktop, and sending a notification to the agent to perform the reverse transformation, wherein in response to the notification, the agent stops cropping of the portions of the first window of the remote desktop that lie outside of the second window;
    receiving, from the agent, complete information that pertains to the portions of the first window of the remote desktop that lie outside of the second window;
    rendering an entirety of the first window of the remote desktop, including the portions of the first window of the remote desktop that lie outside of the second window; and
    changing the task bar of the local desktop to replace the icon of the remote application with the icon of the remote desktop.

5. The method of claim 1, further comprising making a change to the second window, wherein the change includes at least one of changing a position of the second window, changing a size of the second window, or replacing the second window with a window of another remote application.

6. The method of claim 1, wherein after hiding the portions of the first window of the remote desktop, the second window is rendered concurrently on the local desktop along with a window of a local application installed at the client device so as to enable collaboration between the remote application and the local application on the local desktop.

7. The method of claim 1, wherein the action to trigger the transformation from the remote desktop to the remote application includes at least one of mouse movement or a sequence of key presses at the client device.

8. A non-transitory computer-readable medium having instructions stored thereon, which in response to execution by one or more processors of a client, cause the one or more processors to perform a method to transform between a remote desktop and a remote application, wherein the method comprises:
    rendering a first window of the remote desktop on a local desktop of a client device, wherein the first window of the remote desktop includes a second window of an application that runs on the remote desktop;
    detecting an action to trigger transformation from the remote desktop to the remote application, and sending a request to an agent to perform the transformation;
    receiving, from the agent in response to the request, information that pertains to the application that runs on the remote desktop, and based on at least on the received information that pertains to the application that runs on the remote desktop, hiding portions of the first window of the remote desktop that lie outside of the second window to obtain the remote application; and
    changing a task bar of the local desktop to replace an icon of the remote desktop with an icon of the remote application.

9. The non-transitory computer-readable medium of claim 8, wherein the agent crops graphical data of the remote desktop that lie outside of the second window and sends the information pertaining to the cropped graphical data to the client, and wherein the information that pertains to the application that runs on the remote desktop includes a size of the second window and a position of the second window on the remote desktop.

10. The non-transitory computer-readable medium of claim 9, wherein hiding the portions of the first window of the remote desktop that lie outside of the second window includes hiding the graphical data that has been cropped by the agent, and wherein the cropped graphical data includes at least one of an upper bar, a lower bar, and icons displayed on first window of the remote desktop.

11. The non-transitory computer-readable medium of claim 8, wherein the method further comprises:
   detecting an action to trigger a reverse transformation from the remote application back to the remote desktop, and sending a notification to the agent to perform the reverse transformation, wherein in response to the notification, the agent stops cropping of the portions of the first window of the remote desktop that lie outside of the second window;
   receiving, from the agent, complete information that pertains to portions of the first window of the remote desktop that lie outside of the second window;
   rendering an entirety of the first window of the remote desktop, including the portions of the first window of the remote desktop that lie outside of the second window; and
   changing the task bar of the local desktop to replace the icon of the remote application with the icon of the remote desktop.

12. The non-transitory computer-readable medium of claim 8, wherein the method further comprises:
   making a change to the second window, wherein the change includes at least one of changing a position of the second window, changing a size of the second window, or replacing the second window with a window of another remote application.

13. The non-transitory computer-readable medium of claim 8, wherein after hiding the portions of the first window of the remote desktop, the second window is rendered concurrently on the local desktop along with a window of a local application installed at the client device so as to enable collaboration between the remote application and the local application on the local desktop.

14. The non-transitory computer-readable medium of claim 8, wherein the action to trigger the transformation from the remote desktop to the remote application includes at least one of mouse movement or a sequence of key presses at the client device.

15. A computer, comprising:
   a processor of a client; and
   a non-transitory computer-readable medium coupled to the processor and having instructions stored thereon, which in response to execution by the processor, cause the processor to perform operations to transform between a remote desktop and a remote application, wherein the operations comprise:
      render a first window of the remote desktop on a local desktop of a client device, wherein the first window of the remote desktop includes a second window of an application that runs on the remote desktop;
      detect an action to trigger transformation from the remote desktop to the remote application, and sending a request to an agent to perform the transformation;
      receive, from the agent in response to the request, information that pertains to the application that runs on the remote desktop, and based on at least on the received information that pertains to the application that runs on the remote desktop, hide portions of the first window of the remote desktop that lie outside of the second window; and
      change a task bar of the local desktop to replace an icon of the remote desktop with an icon of the remote application.

16. The computer of claim 15, wherein the agent crops graphical data of the remote desktop that lie outside of the second window of and sends the information pertaining to the cropped graphical data to the client, and wherein the information that pertains to the application that runs on the remote desktop includes a size of the second window and a position of the second window on the remote desktop.

17. The computer of claim 16, wherein the operations to hide the portions of the first window of the remote desktop that lie outside of the second window includes operations that comprise:
   hide the graphical data that has been cropped by the agent, and wherein the cropped graphical data includes at least one of an upper bar, a lower bar, and icons displayed on the first window of the remote desktop.

18. The computer of claim 15, wherein the operations further comprise:
   detect an action to trigger a reverse transformation from the remote application back to the remote desktop, and sending a notification to the agent to perform the reverse transformation, wherein in response to the notification, the agent stops cropping of the portions of the first window of the remote desktop that lie outside of the second window;
   receive, from the agent, complete information that pertains to the portions of the first window of the remote desktop that lie outside of the second window;
   render an entirety of the first window of the remote desktop, including the portions of the first window of the remote desktop that lie outside of the second window; and
   change the task bar of the local desktop to replace the icon of the remote application with the icon of the remote desktop.

19. The computer of claim 15, wherein the operations further comprise:
   make a change to the second window, wherein the change includes at least one of change a position of the second window, change a size of the second window, or replace the second window with a window of another remote application.

20. The computer of claim 15, wherein after hiding the portions of the first window of the remote desktop, the second window is rendered concurrently on the local desktop along with a window of a local application installed at the client device so as to enable collaboration between the remote application and the local application on the local desktop.

21. The computer of claim 15, wherein the action to trigger the transformation from the remote desktop to the remote application includes at least one of mouse movement or a sequence of key presses at the client device.

* * * * *